(12) United States Patent
Kreidler et al.

(10) Patent No.: US 10,890,900 B2
(45) Date of Patent: Jan. 12, 2021

(54) CLIENT DEVICE FOR DATA ACQUISITION AND PRE-PROCESSING OF PROCESS-RELATED MASS DATA FROM AT LEAST ONE CNC MACHINE OR INDUSTRIAL ROBOT

(71) Applicant: Cloudbased Industry 4.0 Technologies AG, Stans (CH)

(72) Inventors: Volker Kreidler, Hechingen (DE); Knut Lagies, Bremen (DE)

(73) Assignee: BIG DATA IN MANUFACTURING GMBH, Hechingen (DE)

( * ) Notice: Subject to any disclaimer, the term of this patent is extended or adjusted under 35 U.S.C. 154(b) by 363 days.

(21) Appl. No.: 15/521,407

(22) PCT Filed: Oct. 30, 2015

(86) PCT No.: PCT/CH2015/000160
§ 371 (c)(1),
(2) Date: Apr. 24, 2017

(87) PCT Pub. No.: WO2016/065493
PCT Pub. Date: May 6, 2016

(65) Prior Publication Data
US 2017/0315541 A1    Nov. 2, 2017

Related U.S. Application Data

(60) Provisional application No. 62/073,398, filed on Oct. 31, 2014.

(51) Int. Cl.
*G05B 19/418* (2006.01)
*G06F 1/14* (2006.01)

(52) U.S. Cl.
CPC .......... *G05B 19/4185* (2013.01); *G06F 1/14* (2013.01); *G05B 2219/31326* (2013.01);
(Continued)

(58) Field of Classification Search
CPC ...... G05B 19/4185; G05B 2219/31326; G05B 2219/33098; G05B 2219/34258; G06F 1/14; Y02P 90/087; Y02P 90/18
See application file for complete search history.

(56) References Cited

U.S. PATENT DOCUMENTS 4,878,002 A * 10/1989 Heatzig .............. G05B 19/4141
318/568.2
6,242,880 B1    6/2001 Hong
(Continued)

FOREIGN PATENT DOCUMENTS

| CN | 1122018 A | 5/1996 |
|---|---|---|
| CN | 101145047 A | 3/2008 |

(Continued)

OTHER PUBLICATIONS

International Search Report and Written Opinion—PCT/CH2015/000160—dated Feb. 17, 2016.
(Continued)

*Primary Examiner* — Carlos R Ortiz Rodriguez
(74) *Attorney, Agent, or Firm* — Banner & Witcoff, Ltd.

(57) ABSTRACT

One or more aspects of the present invention relate to a client device and a system for data acquisition and pre-processing of process-related mass data from at least one CNC machine or an industrial robot and for transmitting said process-related data to at least one data recipient, for continuously recording hard-realtime process-related data via at least one realtime data channel, and for recording non-realtime process-related data via at least one non-realtime data channel. The client device may further include at least one data processing unit for data-mapping at least the recorded non-realtime data to the recorded hard-realtime data to aggregate a contextualized set of process-related data. Moreover, the client device may further include at least one second data interface for transmitting the contextualized
(Continued)

set of process-related data to the data recipient and for further data communication with the data recipient.

22 Claims, 2 Drawing Sheets

(52) U.S. Cl.
CPC .............. *G05B 2219/33098* (2013.01); *G05B 2219/34258* (2013.01); *Y02P 90/02* (2015.11)

(56) References Cited

U.S. PATENT DOCUMENTS

| | | | |
|---|---|---|---|
| 6,428,252 B1 | 8/2002 | Oldani | |
| 6,535,788 B1 | 3/2003 | Yoshida et al. | |
| 2002/0091460 A1 | 7/2002 | Allen | |
| 2004/0162887 A1* | 8/2004 | Dillon | G05B 19/4185 709/217 |
| 2005/0004707 A1 | 1/2005 | Kazi et al. | |
| 2005/0113963 A1 | 5/2005 | Cho et al. | |
| 2007/0046677 A1 | 3/2007 | Hong et al. | |
| 2008/0313228 A1* | 12/2008 | Clark | G05B 19/058 |
| 2009/0299509 A1 | 12/2009 | Diezel et al. | |
| 2010/0257228 A1 | 10/2010 | Staggs et al. | |
| 2011/0248821 A1* | 10/2011 | Merten | H04Q 9/00 340/5.74 |
| 2013/0044115 A1 | 2/2013 | Oyama et al. | |
| 2013/0124465 A1* | 5/2013 | Pingel | G06F 3/0604 707/610 |
| 2013/0211555 A1 | 8/2013 | Lawson et al. | |
| 2013/0251342 A1 | 9/2013 | Park et al. | |
| 2014/0277686 A1 | 9/2014 | Wang et al. | |
| 2016/0275133 A1* | 9/2016 | Moore | E21B 47/00 |

FOREIGN PATENT DOCUMENTS

| | | | | |
|---|---|---|---|---|
| CN | 101278243 A | | 10/2008 | |
| CN | 101546184 A | | 9/2009 | |
| CN | 101615038 A | | 12/2009 | |
| CN | 102138110 A | | 7/2011 | |
| CN | 202135167 U | | 2/2012 | |
| CN | 102398226 A | | 4/2012 | |
| CN | 102449617 A | | 5/2012 | |
| CN | 102929219 A | | 2/2013 | |
| CN | 103337150 A | | 10/2013 | |
| CN | 103348694 A | | 10/2013 | |
| DE | 102004052790 | * | 6/2006 | .......... G05B 19/416 |
| DE | 102004052790 B3 | | 6/2006 | |
| EP | 2538288 | * | 12/2012 | .......... G05B 19/042 |
| EP | 2538288 A2 | | 12/2012 | |
| EP | 2538290 | * | 12/2012 | ............. G05B 19/05 |
| EP | 2538290 A2 | | 12/2012 | |
| JP | 2013191128 A | | 9/2013 | |

OTHER PUBLICATIONS

International Search Report—PCT/CH2015/000158—dated Feb. 22, 2016.
International Search Report—PCT/CH2015/000159—dated Feb. 17, 2016.
Oct. 8, 2019—(CN) Office Action—App 201580059058—Eng Tran.
Weck et al "Machine tools 4—Automation of machines and systems" 6th edition, Springer-Verlag Berlin Heidelberg 1995, 2001, 2006.

* cited by examiner

CLIENT DEVICE FOR DATA ACQUISITION AND PRE-PROCESSING OF PROCESS-RELATED MASS DATA FROM AT LEAST ONE CNC MACHINE OR INDUSTRIAL ROBOT

CROSS-REFERENCE TO RELATED APPLICATIONS

This application claims priority to, is a U.S. National Stage application under 35 U.S.C. § 371 of, and incorporates by reference in its entirety, International Application PCT/CH2015/000160 (published as WO/2016/065493 A1), filed Oct. 30, 2015, which claims the benefit of priority to U.S. 62/073,398, filed on Oct. 31, 2014.

The present invention relates to a client device for acquisition and pre-processing of process-related mass data from at least one CNC (Computer Numerical Control) machine or an industrial robot as well as for transmitting said process-related mass data to at least one data recipient, in particular to a cloud-platform, for data analysis by software applications implemented/running thereon.

RELATED ART

Big Data analytics generally refers to the process of collecting, organizing and analyzing large sets of data to discover patterns and other useful information. Along that line, Big Data analytics can help to better understand the information contained within the data and may also help to identify the data that is most important to the business and future business decisions.

In this context, the large quantity of process-related data generated by industrial manufacturing systems, e.g. by a CNC machine, in particular by its controller, its electrical drives and machine-embedded measuring devices, is pre-destinated to apply a broad range of analytics to the manufacturing system and process. Evaluation, analysis and measurement of these data using appropriate software applications may allow for the diagnosis of the workpiece quality, the process quality or the productivity potential of the manufacturing process. For example, indicating and evaluating the relationships of process variables being constantly monitored, such as laser output and feed speed, or tool rotational speed and feed speed of a CNC machine, may allow to infer conclusions about the process quality, fabrication tolerances etc. Likewise, analysis of the tool paths may allow a statement relating to the quality of the workpiece. To make the analysis as accurate and meaningful as possible, many of these applications require a large set of realtime data, preferably fully characterizing the manufacturing system or process to be analyzed as detailed as possible.

So far, access to this industrial data is typically limited to a restricted amount of data only that does not allow to apply any elaborated application as described above. In addition, data access is often limited to applications and devices that share only a common network with the industrial controllers generating the data. The main reason for these limitations is the very nature of most industrial manufacturing systems, e.g. CNC machines or industrial robots, which are controlled by so-called embedded systems. Embedded systems are computer systems with a dedicated function used in a large number of application segments, for example aerospace, automotive, energy generation and transmission and in the process industry. In all of these segments, the main-tasks of embedded system is to control realtime processes. In order to execute this control-task, embedded system are reading data out of the ongoing process and compare at a high frequency the difference between commanded and real data. If the difference is higher than defined, the system calculates a new command/desired value in order to keep the process in the defined state.

In contrast, the requirements of data analytics in the context of Big Data is a completely different as compared to process control. In particular, depending on the analysis application, Big Data applications require recording mass-data out of the running process. These mass-data need to be managed by a large and powerful data-base. For this, Big Data generally requires exceptional technologies and high computational resources to efficiently process these large quantities of data within tolerable elapsed times. For this reason, most Big Data applications run on so called computational cloud platforms, which the mass data are transferred to for high performance analysis. Apart from that, cloud platforms allow data access for multiple users as well as for multiple applications at the same time.

Yet, today's embedded systems have a number of deficits regarding the use for mass data-recording to perform data-analytics applications in the context of Big Data. Current embedded systems do not offer sufficient computational resources for additionally recording the amount of mass data as required for most Big Data application. In particular, the computing-power, memory capacity and communication bandwidth of embedded systems is constrained to the actual control task. If the embedded system is asked to additionally read and record large amounts of data the system is losing the capability of deterministic process control. First, the processor would be overloaded by reading and recording mass-data; second, the local memory would be insufficient, and finally, the communication bandwidth of the system is not powerful enough to transfer the mass data to a data recipient, e.g. a cloud platform via the Internet.

Apart from that, both systems, embedded systems on the one hand and cloud computing platforms on the other hand, are totally different IT-systems which historically have been developing completely independently from each other, each based on their own methods and processes. Embedded systems are designed to control processes, not to collect and provide mass data for Big Data analysis. Furthermore, embedded systems are by nature still proprietary and so are most of their interfaces. A communication with a data recipient on a level as required by most Big Data applications is technically not feasible without any bridging technology.

In particular, both systems are subject to different time regimes. Embedded systems used for controlling tasks are subject to hard realtime computing which requires to guarantee strict response within specified time constraints, typically on a timescale of a few milliseconds down to the sub-millisecond-range. In contrast, cloud computing platforms belong to the regime of non-realtime network communication being characterized by a repetitive transfer of data packages. Hence, most embedded systems integrated in internal factory networks are not capable to communicate via Internet because their communication infrastructure is setup for internal communication only.

In addition, the security requirements and security means of embedded systems and cloud platform system are very different. In particular, cyber security is gaining much higher priority within industry. By looking on the methods and processes of implementing cyber security into computer systems, it is to be noted that most of cyber security processes cannot be implemented into embedded systems because the behavior of security processes will affect the integrity of embedded systems. In addition, most embedded system lack of updatability, i.e. the capability to be updated, which is in contradiction to any reasonable cyber security concept.

Apart from that, many applications for analyzing industrial manufacturing system, e.g. applications for process and productivity analytics of CNC machines, need more data than the controller of CNC machine is able to provide. For example, a Big Data application may want to calculate the average productivity of a CNC milling machine which, however, cannot be calculated based on today's sensor data accessible to the CNC controller. For this specific application, data about milling forces are required in order to determine the utilized capacity of the milling machine. However, for controlling a milling-machine in today's series production, milling forces are neither measured nor considered by the controller of the CNC machine.

For these reasons, today's controllers of CNC machines or industrial robots have only limited capacity to provide process-related mass data to a data recipient due to their limited computational resources. As of today, the data that may be provided only reflect selected aspects and limited time sequences of the manufacturing process, typically on the order of some ten seconds. However, mass data reflecting the full manufacturing process are not available. The available solutions as of today try to extend the functions of existing controllers in order to cover partly the functions that are needed by cloud-based Big Data applications. However, because these kinds of solutions stay within their borders of proprietary software and hardware, they do not have the potential to solve the issue in a broader sense.

BRIEF SUMMARY

Hence, it is an object of the present invention to bridge the gap between highly proprietary industrial manufacturing systems and Big Data analysis systems. In particular, it is an object of the present invention to provide a device for acquisition and pre-processing of process-related mass data from at least one CNC (Computer Numerical Control) machine or an industrial robot as well as for transmitting said process-related mass data to at least one data recipient, in particular to a cloud-platform or cloud based server, for data analysis by software applications implemented thereon.

According to the invention, this object is achieved by a client device according to claim 1 as well by a system according to claim 15.

Many new proposals for data analysis of manufacturing processes of CNC machines or industrial robots, such as applications for process quality or productivity analytics of CNC machines, rely upon the availability of a broad spectrum of process-related mass data that preferably reflect the full manufacturing process as detailed as possible and that typically originate from different sources of the manufacturing system. On the one hand, these process-related mass data are to comprise hard realtime data since CNC machines and industrial robots are so called realtime systems. Per definition, realtime systems allow for controlling an environment by receiving data, processing them, and returning the results sufficiently quickly to affect the environment at that time for which it is imperative that an event be reacted to within a strict deadline. As for a CNC machine, hard realtime process-related data may for example comprise tool path parameters of a processing tool, e.g. a commanded and actual positions, speeds, accelerations, jerks, torques, drive forces, drive currents, with regard to a specific linear or rotary drive axis of the CNC machine. Typically, these hard realtime data are only present at a specific time and replaced by new values within the next controller loop.

On the other hand, many proposed analytics applications also require non-realtime data, such a numerical control (NC) program codes and/or NC program configuration data, machine configuration data, drive configuration data, controller configuration data and configuration data of processing tools, in particular tooling geometries and tooling characteristics, e.g. material removal characteristics.

In the first instance, these realtime and non-realtime process data typically originate from the controller of the CNC machine or industrial robot. However, some data may also be directly received from electrical drives and actuators/motors of the CNC machine or robot or from machine-embedded measuring devices.

According to the invention, it has been realized that the computational resources of today's industrial controllers to capture and transfer process-related mass data—as described above—may normally not provided by the CNC machine or industrial robot itself. Hence, for bigger volumes of data and high data capturing rates, these resources may only be provided by a separate/stand-alone autonomous system parallel to the embedded system, which is the client device of the present invention offering the capability to directly record process-related mass data and to pre-process and transfer data to a data recipient, e.g. a cloud server.

For this task, the client device comprises at least one first data communication interface to at least one controller of the CNC machine or the industrial robot, for continuously recording hard-realtime process-related data via at least one realtime data channel and for recording non-realtime process-related data via at least one non-realtime data channel.

According to a preferred embodiment of the invention, the first data communication interface is configured for data communication via a fieldbus of the CNC machine or industrial robot, e.g. via Profinet, EtherCAT (Ethernet for Control Automation Technology), CAN (Controller Area Network), SERCOS (SErial Realtime COmmunication System). Via these standardized fieldbuses, controllers of CNC machines or robots typically communicates with linear and rotary electrical drives, machine-embedded measurement devices, actors and other peripheral devices within the machine, or even other machines. For this reason, the fieldbuses may also be used by the client device not only as interface to the controller itself, but also as direct data interface to the electrical drives and motors and to machine-embedded measuring devices. According to another aspect of the invention, the fieldbus may comprise at least the realtime data channel.

Furthermore, it has been realized that any meaningful data analysis of process-related mass data strictly relies upon raw data that is properly contextualized or referenced/mapped to each other. The requirement of contextualization/mapping is due to the fact that the raw data originate from different sources within the CNC machine as well as from external sources, e.g. external sensors etc. In addition, the recorded raw data are typically subject to different time regimes, primarily realtime and non-realtime data. Moreover, within the realtime data, different data sources, e.g. position loop controllers, interpolators and electrical drive controllers, generate realtime data at different rates, e.g. different loop time levels. In order to provide any meaningful insight into the recorded mass data and to have the ability at all to discover any patterns or relations of cause and effect, most analytics applications require a contextualization of the recorded raw data, in particular between non-realtime data and hard-realtime data as well as within the realtime data. For example, in order to identify any causality between an erroneous NC program and a defect on the workpiece, it is absolutely essential to refer the realtime axes positions of the CNC machine to the non-realtime active NC program code line and the interpolated cycle within the NC program. For this reason, the client device of the present invention comprises at least one data processing unit for data-mapping at least the recorded non-realtime data to the recorded realtime data to aggregate a contextualized set of process-related data. The most known way of reference, mapping or contextualizing, respectively, is to use time-stamps. Apart from that, the client device may provide different types of process-related metadata in order to allow applications running on the cloud based server to analyze the process data in accordance.

Finally, the client device according to the present invention comprises at least one second data communication interface for transmitting the contextualized set of process-related data to the data recipient. This second data communication interface also enables for further data communication between the client device and the data recipient.

The data recipient may include at least one server of an internal network and/or at least one server of an open network, e.g. the internet. As described above, the data recipient may preferably include at least one server of a cloud infrastructure on which multiple data analysis application are implemented on. The cloud infrastructure itself may be integrated in an internal network, e.g. within the factory, or in an open network. For example, the internal network may be an existing local area network within the factory, in which the one or more embedded systems are integrated and which is already used for data transmission, e.g. orders, commands programs and other data. In addition or alternative to the internal local area network communication, the client device may comprise an internet interface. For this, the communication of the client device with the internet is preferably using strictly outbound communication for security reasons. That basically means that any communication is always initiated by the client device and that this client is not addressable.

In addition, the client device preferably communicates only with authorized servers. In particular, it has been proven to be beneficial that the server addresses cannot be changed during the time of a communication session. The communication between the client device and data recipient (server) can be only initiated by the client device. That is why the device is named as "client". All communication is preferably encrypted. The client device does not allow any local software updates but only by authenticated servers. Moreover, the client device is preferably protected by a local firewall, intrusion detection and virus scanner.

According to another preferred embodiment, the client device is also responsible for the cyber security of the embedded controller of the CNC machine or industrial robot. The client device preferably provides the following security functions for the attached controller:

Monitoring of all controller-communication for irregular communication;
Optional cut-off of the embedded controller against any threatening server-communication.

As a result, the controller of the CNC machine or industrial robot has no direct connection to the internet which in turn reduces the resources and complexity of the controller. In addition, using a separate/stand-alone client device close to the controller for internet communication of the local automation equipment also satisfies customers' IT policy restrictions.

According to another preferred embodiment, the client device may also provide a webserver-like interface towards the connected devices (e.g. CNC controller, machine-embedded and external measuring/sensing devices, peripheral devices such as actuators) that disconnects the devices completely from direct network access also in a local area network (LAN). These kind of devices cannot be directly accessed in their local network but will always initiate any LAN communication via the client device towards their communication partner.

According to another preferred embodiment of the invention, the second data communication interface of the client device is configured for data communication with the data recipient at least partly via wire-based communication and/or wireless communication. For this, the client device may comprise an Ethernet port and/or WLAN (Wireless Local Area Network) port. Furthermore, the client device may be enable for TCP/IP (Transmission Control Protocol/Internet Protocol) and/or http/https (Hypertext Transfer Protocol/Hypertext Transfer Protocol Secure).

Though most of today's controller provide an integrated data recording function for real time data which may already be sufficient for a lot of requirements of data recording, the embedded controller does not have the resources for mass data recording without damaging the main controller task of process control in the course of increasing Big Data requirements. For this extreme data recording requirements, the client may communicate directly with the sensors and actors. For this as well as for providing as much relevant data as possible for prospective data analysis applications, the client device may further comprise at least one further data interface to at least one external sensing device and/or to at least one peripheral devices, e.g. an actuator, an electrical drive or a machine-embedded measuring device, of the CNC machine or industrial robot for directly and continuously recording realtime process-related data bypassing the controller of the CNC machine or industrial robot. For this the client device may comprise a specific subsystem that is responsible for data collection from external sensing devices and/or peripheral devices of the CNC machine or industrial robot via different interfaces, e.g. an A/D-converter, a Bluetooth interface, a digital I/O-interface, a fieldbus interface. In particular, this subsystem may be able to collect sensor data from a big number of sensors in parallel and can read those sensors at high frequencies. Those sensors and peripheral devices may comprise linear scales, rotary scales, linear drives, rotary drives, and/or force sensors.

With regard to the requirement of data mapping, the at least one data processing unit is preferably also configured for data-mapping the hard-realtime process-related data recorded via the further data interface to the hard-realtime and non-realtime process-related data recorded via the first data interface to aggregate a contextualized set of process-related data.

As to the capturing rates, the client device may be—according to another preferred embodiment of the invention—configured to capture and record realtime process-related data at a sampling rate according to the lowest loop-time level of the controller of the CNC machine or industrial robot. In particular, the data capturing and recording may occur at a sampling rate according to the lowest loop-time level of the fastest sub-controller in case the controller comprises a several sub-controllers, preferably according to the loop-time level of a position loop controller of the CNC machine or industrial robot.

Numerically, the client device may be configured to capture and record realtime process-related data at a sampling rate of at least 20 Hz, in particular of at least 33 Hz, preferably of at least 50 Hz, most preferably of at least 100 Hz. Or vice versa, the sampling time is at most 50 ms, in particular at most 30 ms, preferably at most 20 ms, most preferably at most 10 ms.

The recording of realtime data can create very fast a large amount of data which is expected not to be communicated fast enough via the second data communication interface and e.g. the Internet to a cloud platform. Therefore, the client device may provide a large spectrum of methods for data-compression. Hence, according to another aspect of the invention, the client device may be configured for encrypted and/or compressed data communication with the data recipient, in particular to encrypt and/or compress the contextualized set of mapped process-related data.

As described above, the machine system and the system of the data recipient belong to different time regimes. Hence, mass data on the controller side is generated at a specific size and speed/frequency different from the frequency and size on the data recipient side. For this reason, it has proven to be beneficial that the client may be able to balance between the data generation of process data on the controller side and the data acceptance on the data recipient side. Hence, it is preferable that the client device provides sufficient communication resources to handle the communication load to the CNC machine/industrial robot and to the data recipient. Furthermore, it has proven to be beneficial that the client device allows the recorded data to be temporarily stored in a local storage, in particular in the event that communication between the client device and the data recipient is disrupted. So, according to another aspect of the invention, the client device further comprises storage means for data buffering of the recorded realtime process-related data, the non-realtime process-related data and/or of the contextualized set of process-related data.

Furthermore, it has been realized that the significance of the data analysis of process-related mass data essential relies upon the integrity and completeness of the recorded mass data. Hence, it is highly preferable that the CNC machine or industrial robot is able to provide the raw data, in particular the realtime data, with a probability of essentially 100%. Accordingly, it is also highly preferable that the client device is configured to capture and record the realtime process-related data with a probability of essentially 100%.

As the client device of the present invention is an autonomous system separate from the embedded system of the CNC machine or industrial robot on the one side, and from the data recipient on the other side, this approach allows to implement all functions and features mentioned above in parallel the embedded system of the CNC machine or industrial robot without damaging its integrity. The client device may be realized as fat client device, e.g. as an industry personal computer with a standard operating system such as WINDOWS or LINUX, preferably having a direct access point for internet communication. The fat client may comprise the following three major subsystems: First, a subsystem that runs a standard PC operating system (LINUX, WINDOWS). This subsystem is responsible for LAN/WAN integration, it is the run-time environment of possible local applications and carries major parts of the security infrastructure of the client device. It is also the platform for all high-level management tasks of the client device, e.g. configuration management, version control, user management etc. Second, a subsystem that is responsible for network communication (LAN/WAN/UMTS/Bluetooth etc.). Third, a subsystem that is capable of executing realtime tasks and serves as front end to the connected controllers and realtime fieldbuses and is also the direct data interface to external sensing devices or peripheral devices.

In cases very short response times for limited analytic functions are required, the client device may provide standalone data analytics functions. The results of these functions may be communicated directly to LAN devices (automation equipment, PCs, servers etc.). The standalone capabilities may in particular be foreseen for in case the client device is connected to networks with very limited bandwidth or in case of only part-time connections to the data recipient, e.g. to a cloud platform. Therefore, according to another aspect of the present invention, the client device is configured to locally perform data analysis of the contextualized set of process-related data. In particular, the client device may be configured to locally perform a realtime data analysis task of the contextualized set of process-related data in order to affect the running process of the CNC machine or industrial robot in closed loop by the result of the local realtime data analysis. The closed loop feedback may accomplished in particular via a closed loop realtime data communication interface and/or or a closed loop realtime fieldbus.

Different big data may require different raw data by size/volume, frequency and data context information. Therefore, according to another aspect of the invention, there may be a set of commands towards the controller of the CNC machine or industrial robot by the client device to configure the controller for recording specific data according to a specific data analysis application. These commands towards the controller are highly proprietary and depend also on the functionality of the controller. These data capturing commands may be preferably executed by executable software applications downloaded via the second data communication interface from the data recipient, e.g. a cloud platform. The executable software applications may use a driver software layer of the client device which hides the specifics of the embedded controller from the downloaded applications. Hence, according to another aspect of the present invention, the client device may be configured to receive and perform executable software applications and/or software updates from the data recipient via the second data communication interface, in particular executable software applications instructing the client device to perform a specific data recording task and/or local data analysis task.

To further enhance the significance of the data analysis, the client device may further comprise unique identification means with respect to the at least one controller, the at least one external sensing device or the at least one peripheral device of the CNC machine or the industrial robot, respectively, enabling the data recipient to associate the data received from the client device with its respective source.

Apart from the first and second data communication interface as well as from the further direct data interface to external sensing devices and/or peripheral devices of the CNC machine/industrial robot, the client device may further comprise an inter-client interface for data communication with at least another client device.

The object of the present invention is also achieved by a system for providing process-related mass data from a controller of at least one numerical controlled industrial processing machine or of an industrial robot to at least one data recipient. This system comprises:

at least on client device according to present invention;

at least one controller of at least one CNC machine or industrial robot in data communication with the at least one client device for continuously recording realtime process-related data via at least one realtime data channel and non-realtime process-related data via at least one non-realtime data channel;

at least one data recipient in data communication with the client device via the at least one second data communication interface for receiving the contextualized set of process-related data provided by the client device.

As described above, the data recipient may include at least one server of an internal network, at least one server of an open network, e.g. the internet, and/or at least one server of a cloud infrastructure.

According to a preferred embodiment of the system, the data recipient provides a cloud-based user platform, in particular for different users, to perform analysis applications on the contextualized set of process-related data provided by the client device. With regard to a multiuser topology, this means that analysis applications on the cloud can be used by different user groups. At the same time, the cloud database can be used by different user groups to implement their own applications. The user groups may be IT-companies, OEM's (machine builder, automation-, drives-, supervisory control and data acquisition (SCADA)-suppliers), end-users (producing companies), service-provider, component-supplier, engineering companies, and/or universities/research organizations.

Software applications developed by different user groups may be uploaded to the cloud platform by an open architecture interface of the cloud platform. In general, the applications may be classified into server applications and client applications. Server applications are typically analytical algorithms using uploaded data by the client device, whereas client applications are downloaded onto the client device in order to instruct the client for a specific data-recording task.

According to another aspect of the invention, a development environment for these kinds of applications may be provided that will cover especially the usage of application programming interfaces (API) for server applications and client applications. The development environment may also contain a PC-based simulator to integrate and test both kinds of applications without the need to run the applications on the target systems in the first place. The capability to upload and run software from different user groups is crucial for the concept of Big Data because this is the basis of a big number of applications from different technologies covering different processes and devices.

Because the requirements of new Big Data analytics is growing, it is preferable that the client device can be constantly upgraded by software. For this reasons, the cloud-platform as well as the client device may provide an infrastructure for updating third party applications. For security reasons software uploads to the cloud server and/or client device is controlled by a central authority and pass through a system of central management servers.

As described above, with regard to the further data interface of the client device, the system may further comprise at least one external sensing device and/or at least one peripheral devices of the CNC machine or robot, e.g. at least one actuator of the CNC machine or industrial robot, in data communication with the client device via at least one further data interface, This further data interface may include an A/D-converter, a Bluetooth interface, a digital I/O-interface, a fieldbus interface. For this, the client device may be configured to directly and continuously record realtime process-related data from the external sensing device and/or actuator.

With regard to the contextualization of the recorded raw data, the at least one controller may be configured to attach a context tag as kind of metadata, e.g. a time tag, to the realtime process-related data as well as to the non-realtime process-related data. This time tag is provided to the client device via the realtime and non-realtime channels, enabling the client device to attach the context tag, e.g. the time tag, provided by the controller to the recorded realtime process-related data from external sensing devices and/or one peripheral devices, too. With the regard to functionality of the client device for data mapping, the client device or its at least one data processing unit for data-mapping is configured to merge the different data channels using the context tag to form a consistent set of contextualized data that is provided to the data recipient for any data analytics applications.

According to another aspect of the invention, the system may comprise a plurality of client devices and a plurality of controllers, wherein each client device of the plurality of client devices is in data communication with a respective one of the plurality of controllers and in data communication with the at least one data recipient. Moreover, the plurality of client devices may be in data communication with each other, e.g. within a LAN, preferably via their respective inter client interfaces.

This configuration may help to share resources. For example, in case one client device run out of buffering memory, other client devices in the LAN may provide additional buffering memory. Likewise, in case the communication between one client device and the data recipient is disrupted, other client devices may serve as connecting bridge or bypass. In case data mapping is required across several client devices and the CNC machines/industrial robots connected thereto, one client device may provide a master context tag, e.g. master time tag, for all interconnected client devices within the system.

Moreover, in case the data recipient, e.g. a cloud server, lost connection to a specific client device, it may ask another client device within the system to check that specific client device. Furthermore, the data recipient may also be configured to initiate reboot of a specific client device without direct connection between this specific client device and the data recipient.

In general, it is also possible that the system comprises at least one client device that is in data communication with a plurality of CNC machines or industrial robots.

With regard to cloud-based applications for data analysis, the following infrastructure may be provided by the client device and used by the cloud-based applications to execute their data analytics functions:

Download of software applications onto the client device on request by the client device;

Software-applications can be started, stopped and deleted;

Provisioning of APIs for communication with the applications;

System-software and applications of the client device can be upgraded by the cloud server.

The client device provides for the local applications a runtime environment for APIs:

The device-API allows the software-applications to get access to the data of the attached embedded system, i.e. the CNC machine or industrial robot;

Applications can exchange data and commands by the server-API;

A runtime-library on the client device provides for the applications a wide range of functionality.

A runtime engine on the client device controls administration and execution of applications and controls further tasks such as security management and system update. The runtime engine is able to execute multiple applications. A driver-layer of the client device decouples the specific protocols and data-formats of the different embedded devices.

The client device has no user interface device (e.g. a monitor) attached, because the client device is in most cases integrated in the machine, hidden in a closed rack etc. On the other hand, it is in many cases important for users to communicate directly with the client device such as configuration and setup, maintenance, emergency situations etc. The client device may provide this user interface via network (LAN, WLAN) for handheld devices like smart phone or tablets and also for connected PCs. This user interface may be supported by a special application on the remote device.

The client device may further provide a setup environment which may be used during initial setup of the device to configure its runtime environment. The following functions may be part of this tool:
Network configuration and setup;
I/O configuration (sensors, actors);
Setup of fieldbus systems;
System configuration of client device;
Automated device setup ("plug and play");
Security setup.

The client device may also provide an administration interface in order to manage its software and hardware in different environments. This tool may provide at least one of the following functions: device status; network topology, software update management and/or security management.

For local and remote maintenance activities of the client device itself, it may provide a set of self-diagnostic functions: hardware diagnostic (e.g. memory disk, temperature, health status etc.), network status, configuration check, and or communication stages with regard to sensors and connected devices. The self-diagnostics software is considered as an application and is therefore not part of the system software of the client device. It may be downloaded to the client device at the system boot of the client device. An application on the data recipient/server side may use the data to provide condition monitoring functions as part of system administration tool set of the data recipient/cloud server. The self-diagnostic function can also be used via the local graphical user interface to give access to diagnostic data and functions to local service activities without the need of having access to the cloud server.

In many cases, the client device is the data collection front end of a cloud-server system and the database applications running on those cloud servers. But for small installations and in emergency cases the client device is also capable of providing some reduced functionality, which is normally provided by the cloud server system. The user interface for these functions is provided via the local graphical user interface as described above.

The client device may support a variety of functions for the configuration management of itself, the connected devices and the attached sensors and actors. All configuration data of the connected devices are stored and can be requested via the cloud server and the local user interface. All changes of these data are tracked and stored with appropriate reference data. Checks of hardware/software compatibility may be implemented in order to provide information for update/upgrade/maintenance cases. All these data can be accessed via the local user interface and can be manually changed with the appropriate tracking information.

The client device may comprise a set of internal sensors as part of its own hardware. These sensors support condition monitoring and some management functions of the client device. For example, the internal sensors may comprise internal temperature sensors, GPS (Global Positioning System) sensors or LPS sensors (Linear Position Sensor).

For standard LAN service software like MES (Manufacturing Execution Systems), the client device may provide a data interface that does require to download software onto the client device. This data interface may comprise pre-installed interface software on the client device that uses the same runtime environment as the software normally downloaded from the connected data recipient/cloud server. This approach facilitates existing server software to capture data from the client device because these servers just need to use their standard way of accessing data on devices and do not have to provide a software download infrastructure for their connected devices.

In many configurations a plurality of client devices may be part of a LAN/WLAN system. Because these client devices are preferably able to communicate with each other, they provide several functions which are based on the cooperation of several client devices. This co-operational capability may be used for fleet management, security and availability control between the client devices in the network, and/or replacement of communication functions in emergency cases.

The client device may have access to the entire configuration data of its attached embedded systems, i.e. CNC machines or industrial robots, and may comprise a dedicated infrastructure to manage software update and upgrades. Consequently the client device may be able to implement functions to update/upgrade all software systems that the client device has access to.

Furthermore, the client device may comprise a hardware and software infrastructure configured for direct connection to mobile networks (e.g. UMTS). This kind of connectivity can be used in several situations, e.g. for system setup while LAN access might not be available, or in emergency cases where LAN access might be lost. The software of the client device may also provide hot-spot capability so that several client devices might use one client as an internet gateway.

BRIEF DESCRIPTION OF THE DRAWINGS

Further advantages and details of the present invention emerge by using the exemplary embodiment illustrated in the following text and in conjunction with the figures.

DETAILED DESCRIPTION

Figure 1:
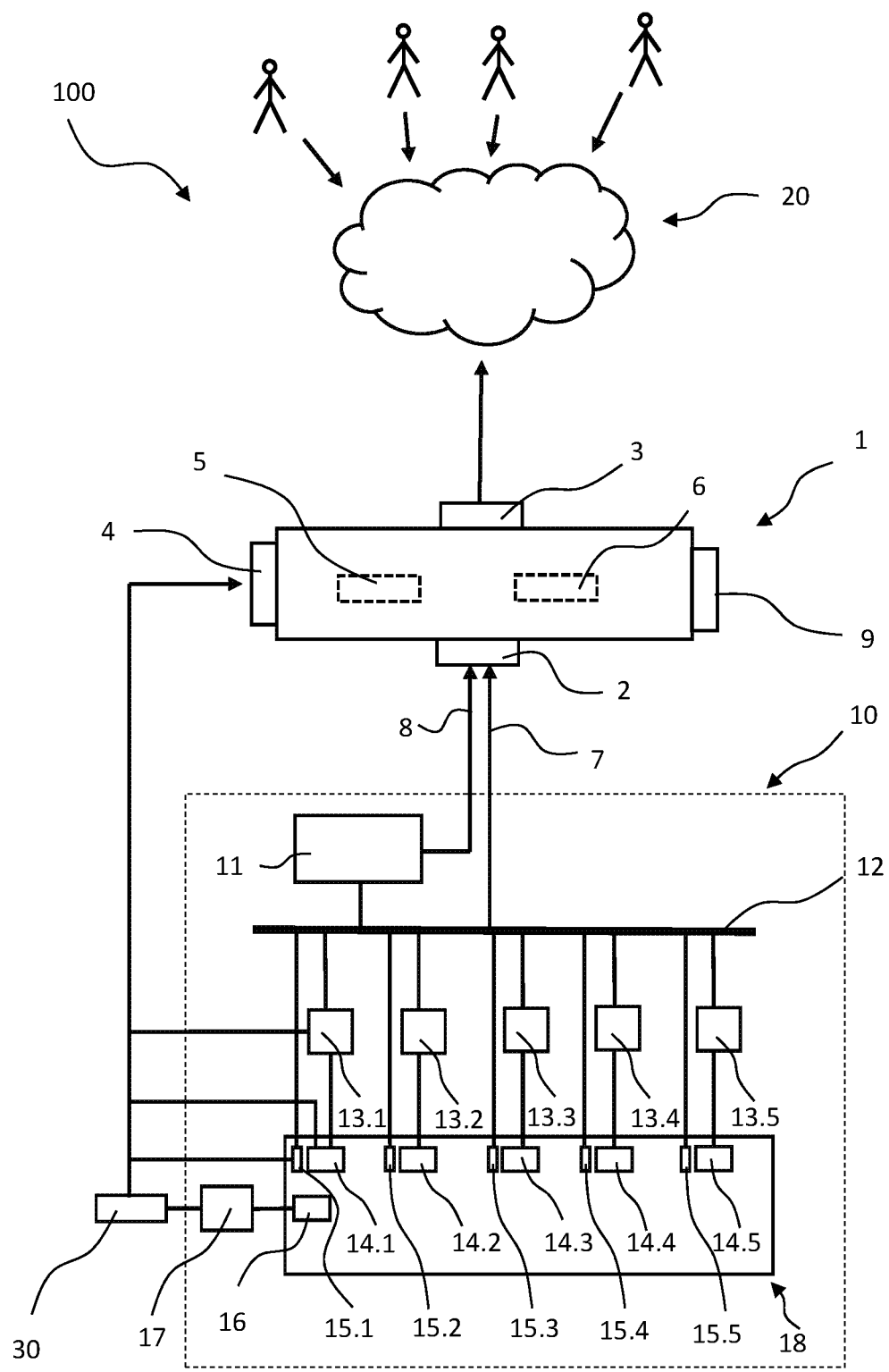
FIG. 1 shows an exemplary embodiment of a client device and a system according to the present invention.

An exemplary embodiment of the present invention—as schematically illustrated in FIG. 1—is described by way of an exemplary system 100 using a client device 1 for providing process-related mass data from a controller 11 of a CNC machine 10 to a cloud-based server 20 for data analysis using software applications running on the cloud-based server 20.

Although a CNC machine is described as primary example of the type of automation system with which the present invention may be put to use, the system 100 and the client device 1 according to the present invention could be used with any automation system involving a realtime control of industrial equipment, e.g. an industrial robot.

FIG. 1 illustrates an example of a 5-axes CNC milling center. The CNC machine 10 is operated by a CNC controller 11 and comprises electrical drives 13.1-13.5 for each actuator 14.1-14.5 of the respective machine axes. According to the present embodiment, the CNC machine comprises three linear Cartesian machine axes with linear actuators 14.1-14.3 and two additional rotary machine axes with rotary actuators 14.4 and 14.5, wherein for example one of the rotary axes may be used for rotating a machine table carrier and the other rotary axis may be used in a tool changer.

The machining of a specific workpiece by the CNC machine is based on machining commands of a corresponding NC-program which are converted by the CNC machine 10 into machining actions, i.e. into movements of the actors 14.1-14.5 of the different machine axes and into rotary movement of a spindle actuator 16 of the milling tool. These actuators belong to the mechanical/machining part 18 of the CNC machine 10. For this, the CNC controller 11 generates corresponding command values for each axis and the milling tool which are communicated via a local fieldbus 12, e.g. Profinet, to the electrical drives 13.1-13.5 of all axes and the electrical spindle drive 17 of the spindle actuator 16. The fieldbus 12 is a realtime communication fieldbus used for the internal communication of the CNC machine 10 between the CNC controller 11 and the electrical drives 13.1-13.5, 17. The machine-embedded measuring devices/sensors 15.1-15.5 used for measuring the actual positions of each axis may also be connected to the fieldbus 12. The electrical drives 13.1-13.5 are electrical devices comprising controlling means as well as amplifiers that receive commanded axis positions and axis velocities from the CNC controller 11 and converts them into electrical power/current for driving the actuators 14.1-14.4 of the respective axis. In order to control the movement along each axis, the machine-embedded measuring devices 15.1-15.5, e.g. high-resolution linear scales, are continuously measuring the actual position for feedback via the fieldbus 12 to the controller within the electrical drives 13.1-13.5 and the CNC controller 11, respectively.

As described above, new proposals for data analysis in the context of Big Data, Internet of Things and Industry 4.0 focus onto manufacturing processes of CNC machines or industrial robots, such as applications for process quality or productivity analytics of CNC machines. Most of these analytics applications based on the Big Data approach rely upon the availability of a broad spectrum of process-related mass data that preferably reflect the full manufacturing process of a CNC machine as detailed as possible and that typically originate from different sources of the manufacturing system. On the one hand, these process-related mass data are expected to comprise hard realtime data related to the manufacturing process of the CNC machine, for example tool path parameters of a processing tool, e.g. a commanded and actual positions, speeds, accelerations, jerks, torques, drive forces, drive currents, with regard to each linear and rotary drive axis of the CNC machine. Typically, these hard realtime data are only present at a specific time and replaced by new values within the next controller loop. On the other hand, many analytics applications also require non-realtime data, such a numerical control (NC) program codes and/or NC program configuration data, machine configuration data, drive configuration data, controller configuration data and configuration data of processing tools, in particular tooling geometries and tooling characteristics, e.g. material removal characteristics. As further described above, the computational resources of today's CNC controllers are limited being only capable to record those data out of the process that are directly related to the main task of the controller—i.e. controlling the process. Only, if a limited amount of data needs to be captured, a buffering trace function may allow for capturing data in parallel to controlling the ongoing process and to provide them at an interface, however, only up to the limits of the resources in terms of performance and memory of the CNC controller.

According to the present invention, it has been realized that providing process-related mass data out of a CNC machine 10 to a data recipient 20 such as a cloud-based server for Big Data analytics may only be accomplished by using a separate autonomous device parallel to the controller 11 of the CNC machine 10 that is capable, on the one hand, for data acquisition and pre-processing of process-related mass data from the CNC machine 10 and, on the other hand, for transmitting said process-related mass data to a respective data recipient 20 such as a cloud-based server.

According to the present invention, this separate device is realized as client device 1 being an interconnecting gateway between the data recipient 20, i.e. in the present embodiment a cloud-based server, and the CNC machine 10. For this, the client device 1 comprises a first data communication interface 2 to the controller 11 of the CNC machine 10 for continuously recording hard-realtime process-related data via at least one realtime data channel 7, as well as for recording non-realtime process-related data via at least one non-realtime data channel 8. This first data communication interface 2 is configured for data communication via the fieldbus 12 of the CNC machine 10, i.e. the client device 1 directly couples to the fieldbus 12 to record at least the hard-realtime data being communicated within the CNC machine 10 via the fieldbus as described above. However, the non-realtime process-related data may also be recorded/communicated via the fieldbus 12. Alternatively, the non-realtime process-related data communicated via the non-realtime channel may be transferred via a separate line, different from the fieldbus, e.g. via a separate channel based on Ethernet and TCP/IP, as depicted in FIG. 1.

Today's fieldbuses are designed for small data packages, commands and status information. However, the fieldbus protocols may be easily extended by commands and procedures in order to communicate larger data volumes. As to the protocols, the client device 1 may communicate with the CNC machine 10 via TCP/IP (Transmission Control Protocol/Internet Protocol).

In order to provide as much relevant data as possible for prospective data analysis applications, the client device 1 is configured to capture and record the realtime process-related data at a sampling rate according to the lowest loop-time level of the CNC controller 11, in particular according to the lowest loop-time level of the fastest sub-controller which is the so called position loop controller of the CNC machine 10. With regard to the present embodiment, the client device 1 is configured to capture and record realtime process-related data at a sampling rate of at least 20 Hz, most preferably of at least 100 Hz.

According to the invention, the client device 1 further comprises a second data communication interface 3 for transmitting the recorded process-related mass data to the data recipient 20 and for further data communication with the data recipient 20. With regard to the present embodiment, this second data communication interface 3 is configured for data communication with the cloud-based server 20 via internet. For this, the client device 1 may comprise an Ethernet port and/or WLAN (Wireless Local Area Network) port. Furthermore, the client device 1 is enabled for TCP/IP (Transmission Control Protocol/Internet Protocol) and http/https (Hypertext Transfer Protocol/Hypertext Transfer Protocol Secure). Hence, the client device 1 according to the present invention manages the internet communication of the CNC machine 10, facilitating to reduce the computational resource requirements and complexity of the CNC controller 11. In addition, as the CNC controller 11 has no direct connection to the internet, the integrity of the CNC controller 11 with regard to cyber security is guaranteed in accordance with customers' IT policy. Moreover, the computing resources of the client device 1 allow for additional security functions close to the CNC machine 10 which further increase the cyber security of the CNC controller 11. The communication of the client device 1 with the internet is using strictly outbound communication for security reasons. That basically means that any communication is always initiated by the client device 21 which, in turn, is not addressable.

As described above, the primary task of the CNC controller 11 is to control the realtime machining process. For this task, the CNC machine 10 includes machine-embedded sensors 15.1-15.5 the controller 11 has access to via the fieldbus 12. However, many Big Data-applications need more raw data than the installed sensors as of today are able to provide. For this reasons, the client device 1 may comprise at least one further data interface 4 to at least one external sensing device and/or to at least one peripheral devices, e.g. an actuator, an electrical drive or a machine-embedded measuring device, of the CNC machine or industrial robot for directly and continuously recording hard-realtime process-related data bypassing the controller 11 of the CNC machine 10. As to the present exemplary embodiment shown in FIG. 1, an additional force-sensor 30 is installed in the spindle actuator 17 of the milling tool 16 that is directly connected to the client device 1 via the further data interface 4. Having access to these milling force data may enable a specific application on the cloud-based server 20 to calculate the average productivity of the machine and to reveal unused productivity potential. The at least one further data interface 4 preferably comprises an A/D-converter, a Bluetooth interface, a digital I/O-interface and/or a fieldbus interface.

The client device 1 may be realized as fat client device, e.g. as an industry personal computer with a standard operating system such as WINDOWS or LINUX, preferably having a direct access point for internet communication and a data processing unit 5.

In order to provide any meaningful insight into the recorded mass data and to provide the ability at all to discover any patterns or relations of cause and effect within the process data, the analytics applications require a contextualization of the recorded raw data, in particular between the non-realtime data and the hard-realtime data as well as within the hard-realtime data itself. For this, the CNC controller 11 of the present embodiment is configured to attach a context tag as kind of metadata, e.g. a time tag, to the realtime process-related data as well as to the non-realtime process-related data. This time tag is provided to the client device 1 via the realtime 7 and non-realtime channels 8, enabling the client device 1, i.e. its data processing unit 5, to attach the context tag, e.g. the time tag, provided by the CNC controller 11 to the recorded realtime process-related data from external sensing devices and/or one peripheral devices, too. Finally, the data processing unit 5 of the client device 1 is configured to merge the different data channels using the context tag to form a consistent set of contextualized data that is provided to the cloud-based server 20 for data analytics. For example, the client device 1 is configured to record the axes positions (hard real time data) from the CNC machine 10 via the realtime channel 7 including a consecutive time tag according to the lowest loop level of the position loop controller of the CNC machine 10. The time tag is also provided to the active NC program code used by the controller 11 of the CNC machine 10. Both, the hard-realtime axes position data and the NC program data, are recorded by the client device 1 via the first data communication interface 2 including the attached time tags. While the hard-realtime axes positions are continuously communicated via the realtime channel 7 of the fieldbus, the NC program data is communicated via the non-realtime channel 8. In addition, the client device 1 may attach the time tag provided by the CNC controller 10 to the hard-realtime data recorded via the further data interface 4 from the additional force-sensor 30 attached to the spindle actuator 17. As one very essential aspect of the present invention, the data processing unit of the client device 1 merges the different data channels using the time tag to form a consistent set of contextualized data, wherein the hard-realtime axes position data and the hard-realtime force-sensor data are mapped/referred to the specific NC program code that was active when the respective hard-realtime were generated.

The recording of hard-realtime data at a sampling rates of at least 20 Hz creates very fast a large amount of data which often cannot be communicated fast enough via the internet to the cloud platform 20. Therefore, the client device 1 is configured for compressed data communication with the cloud-based server. Furthermore, the client device comprises storage means 6 for data buffering of the recorded mass data to buffer network failure. Apart from that, the client device is configured to capture and record hard-realtime process-related data with a probability of essentially 100% in order to guarantee the significance of data analysis.

In addition, the client device according to the present exemplary embodiment shown in FIG. 1 is configured to receive and perform executable software applications and/or software updates from the cloud-based sever 20 via the second data communication interface 3, in particular executable software applications instructing the client device 1 to perform a specific data recording task and/or local data analysis task. These standalone local data analysis tasks are in particular highly preferable in case very short times for limited analytic functions are required or in case the communication bandwidth between the client device 1 and the cloud-based server 20 is very limited. In particular, the client device 1 may be configured to locally perform a realtime data analysis task of the contextualized set of process-related data in order to affect the running process of the CNC machine or industrial robot in closed loop by the result of the local realtime data analysis. The closed loop feedback may accomplished in particular via a closed loop realtime data communication interface and/or or a closed loop realtime fieldbus.

As illustrated in FIG. 1, the system 100 with the client device 1 in data communication with the cloud server 20 via internet realizes a multiuser topology to perform analysis applications on the recorded mass data. This means that the data and the analysis applications on the cloud server 20 can be used by different user groups, and at the same time, the cloud database can be used by different user groups to implement their own applications. The user groups may be IT-companies, OEM's (machine builder, automation-, drives-, supervisory control and data acquisition (SCADA)-suppliers), end-users (producing companies), service-provider, component-supplier, engineering companies, and/or universities/research organizations.

Figure 2:
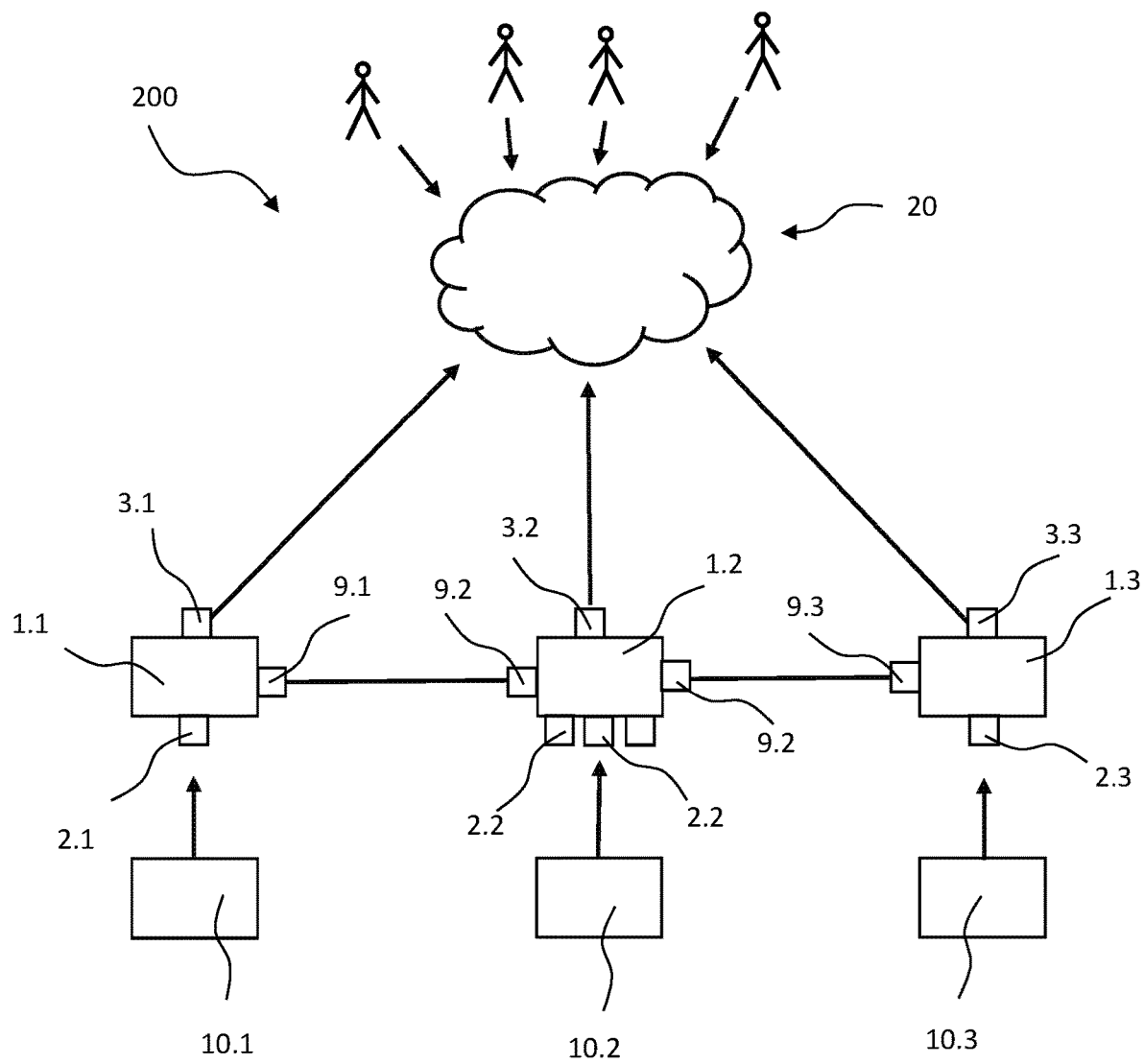
FIG. 2 shows another embodiment of the present invention illustrating a system comprising a plurality of client devices.

Referring now to FIG. 2, another embodiment of the present invention is shown, schematically illustrating a system 200 for acquisition and pre-processing of process-related mass data from a plurality of CNC machines 10.1-10.3 and for transmitting said process-related mass data to a cloud server 20 for data analysis. For this, the system 200 comprises a plurality of client devices 1.1-1.3 according to the present invention, wherein each client device 1.1-1.3 is in data communication with a receptive controller of a respective one of the plurality of CNC machines 10.1-10.3 via its first data communication interface 2.1-2.3. Accordingly, each client device 1.1-1.3 is in data communication, e.g. via internet, with the cloud server 20 by its second data communication interface 3.1-3.3. Each data line/unit, consisting of one CNC machine 10.1-10.3, one interlinking client device 1.1-1.3 and the cloud server 20, may be basically configured similar or equal to the embodiment of the system 200 as described with regard to FIG. 1. In addition, the plurality of client devices 1.1-1.3 may be in data communication with each other, e.g. within a LAN, via their respective inter-client interfaces 9.1-9.3. This configuration allows to share resources. For example, in case one client device runs out of buffering memory, the other client devices in the LAN may provide additional buffering memory. Likewise, in case the communication between one client device 1.1 and the cloud 20 is disrupted, the other client devices 1.2, 1.3 may serve as connecting bypass. Moreover, in case the cloud server 20 lost connection to a specific client device, it may ask another client device within the system to check that specific client device. In general, it is also possible that at least one of the client devices, e.g. the client device 1.2, is in data communication with a plurality of CNC machines. For this, the specific client device 1.2 may comprise a plurality of first data communication interfaces 2.2, one for each CNC machine.

The invention claimed is:

1. A client device comprising:
   at least one first data communication interface configured to be connected to at least one controller of an external device, the at least one first data communication interface comprising at least one hard-realtime data channel via which hard-realtime data is configured to be received and at least one non-realtime data channel via which non-realtime data is configured to be received;
   a memory;
   at least one processor configured to store, in the memory, the hard-realtime data, received via the at least one hard-realtime data channel, as time-stamped hard-realtime data and configured to store, in the memory, the non-realtime data, received via the at least one non-realtime data channel, as time-stamped non-realtime data, wherein the processor is further configured to order the time-stamped hard-realtime data with the time-stamped non-realtime data; and
   at least one second data communication interface configured to transmit, to a cloud-based server, the ordered time-stamped hard-realtime data and ordered time-stamped non-realtime data and configured to receive, from the cloud-based server, additional data,
   wherein the external device comprises at least one computer numerical control (CNC) machine or an industrial robot.

2. The client device according to claim 1, further comprising:
   at least one third data interface configured to be connected to at least one external sensing device or to at least one peripheral device of the CNC machine or industrial robot,
   wherein the processor is further configured to time stamp and store, in the memory as time-stamped hard-realtime process-related data, hard-realtime process-related data relating to the CNC machine or industrial robot without passing through the controller, and
   wherein the at least one third data interface comprises an A/D-converter, a Bluetooth interface, a digital I/O interface or a fieldbus interface.

3. The client device according to claim 2,
   wherein, based on instructions stored in the memory, when executed by the processor, the processor is configured to aggregate the time-stamped hard-realtime process-related data recorded via the third data interface to the time-stamped hard-realtime data and time-stamped non-realtime data, recorded via the first data interface, to into time-ordered data.

4. The client device according to claim 1,
   wherein the client device is configured to capture and record hard-realtime process-related data at a sampling rate according to a lowest loop-time level of the at least one controller of the CNC machine or industrial robot, and
   wherein the at least one controller comprises several sub-controllers according to the lowest loop-time level of the fastest sub-controller, according to the loop-time level of a position loop controller of the CNC machine or industrial robot.

5. The client device according to claim 1,
   wherein the client device is configured to capture and record hard-realtime process-related data at a sampling rate of at least 20 Hz.

6. The client device according to claim 3, further comprising:
   memory configured to buffer the time-stamped hard-realtime process-related data, the time-stamped non-realtime data, or the time-ordered data.

7. The client device according to claim 1,
   wherein the at least one first data communication interface is configured for data communication via a fieldbus of the CNC machine or industrial robot.

8. The client device according to claim 1,
   wherein the at least one second data communication interface is configured for data communication with the cloud-based server at least partly via wire-based communication or wireless communication.

9. The client device according to claim 1,
   wherein the client device is configured for encrypted or compressed data communication with the cloud-based server.

10. The client device according to claim 1,
    wherein the client device is configured to capture and record hard-realtime process-related data with a probability of essentially 100%.

11. The client device according to claim 1,
wherein the client device is configured to locally perform data analysis of the ordered time-stamped hard-realtime data and ordered time-stamped non-realtime data.

12. The client device according to claim 1,
wherein the client device is configured to receive and perform executable software applications or software updates from the cloud-based server via the at least one second data communication interface.

13. The client device according to claim 11,
wherein the client device is configured to locally perform a realtime data analysis task of the ordered time-stamped hard-realtime data and ordered time-stamped non-realtime data in order to affect a running process of the CNC machine or industrial robot in closed loop by a result of the locally performed realtime data analysis task.

14. The client device according to claim 1, further comprising:
an inter-client interface for data communication with at least another client device.

15. A system for providing process-related mass data from at least a controller of at least one CNC machine or of an industrial robot to at least one data recipient, the system comprising:
at least one client device according to claim 1;
at least one controller of at least one CNC machine or industrial robot in data communication with the at least one client device for continuously recording hard-realtime process-related data via at least one hard-realtime data channel and non-realtime process-related data via at least one non-realtime data channel; and
at least one data recipient in data communication with the at least one client device via the at least one second data communication interface for receiving the ordered time-stamped hard-realtime data and ordered time-stamped non-realtime data provided by the at least one client device.

16. The system according to claim 15,
wherein the at least one data recipient includes at least one server of an internal network, at least one server of an open network or at least one server of a cloud infrastructure.

17. The system according to claim 15,
wherein the data recipient provides a user platform to perform analysis applications on the the ordered time-stamped hard-realtime data and ordered time-stamped non-realtime data provided by the client device.

18. The system according to claim 15,
wherein the at least one controller is configured to attach a context tag to the ordered time-stamped hard-realtime data and ordered time-stamped non-realtime data.

19. The system according to claim 15, further comprising:
at least one external sensing device or at least one peripheral device in data communication with the client device via at least one further data interface,
wherein the client device is configured to directly and continuously record hard-realtime process-related data from the at least one external sensing device or peripheral device of the CNC machine or industrial robot.

20. The system according to claim 18,
wherein the client device is configured to attach the context tag provided by the controller to the recorded hard-realtime process-related data from at least one external sensing device or a peripheral device of the CNC machine or industrial robot.

21. The system according to claim 15,
wherein the system comprises a plurality of client devices and a plurality of controllers, each client device of the plurality of client devices in data communication with a respective one of the plurality of controllers and in data communication with the at least one data recipient.

22. The system according to claim 21,
wherein the plurality of client devices are in data communication with each other via inter-client interfaces.

* * * * *